United States Patent [19]
Onodera

[11] Patent Number: 5,521,711
[45] Date of Patent: May 28, 1996

[54] INFORMATION PROCESSING APPARATUS, AND METHOD OF REVERSING COLOR THEREIN

[75] Inventor: Ken Onodera, Yokohama, Japan

[73] Assignee: Canon Kabushiki Kaisha, Tokyo, Japan

[21] Appl. No.: 475,831

[22] Filed: Jun. 7, 1995

Related U.S. Application Data

[63] Continuation of Ser. No. 770,425, Oct. 3, 1991, abandoned.

[30] Foreign Application Priority Data

Oct. 9, 1990 [JP] Japan .................. 2-269623

[51] Int. Cl.⁶ .................. H04N 1/29; H04N 1/46; G03F 3/08; G06F 15/00
[52] U.S. Cl. .................. 358/300; 358/438; 358/518; 358/523; 358/530; 382/167; 395/131
[58] Field of Search .................. 358/296, 298, 358/300, 438, 448, 452, 464, 500, 501, 504, 518–524, 529–531, 537; 382/162, 163, 167; 355/38, 208, 326 R, 327, 328; 347/115, 172, 232; 395/131; 345/22, 153, 186, 199

[56] References Cited

U.S. PATENT DOCUMENTS

| | | | |
|---|---|---|---|
| 4,122,462 | 10/1978 | Hirayama et al. | 354/5 |
| 4,648,028 | 3/1987 | DeKlotz et al. | 340/703 X |
| 4,694,354 | 9/1987 | Tanaka et al. | 358/296 |
| 4,754,325 | 6/1988 | Ishida et al. | 358/452 X |
| 4,777,510 | 10/1988 | Russel | 355/328 X |
| 4,788,535 | 11/1988 | Chikara et al. | 340/703 |
| 4,807,041 | 2/1989 | Kishi et al. | 358/452 |
| 4,829,371 | 5/1989 | Hiramatsu et al. | 358/80 |
| 4,922,335 | 5/1990 | Outa et al. | 358/80 |
| 4,942,461 | 7/1990 | Abe et al. | 358/448 X |
| 4,953,104 | 8/1990 | Yeh et al. | 346/157 X |
| 4,959,711 | 9/1990 | Hung et al. | 358/523 |
| 4,999,716 | 3/1991 | Nakamura | 358/434 |
| 5,028,991 | 7/1991 | Sezikawa et al. | 358/75 |
| 5,384,902 | 1/1995 | Carlsen | 395/131 |
| 5,428,720 | 6/1995 | Adams, Jr. | 395/131 |

FOREIGN PATENT DOCUMENTS

| | | | |
|---|---|---|---|
| 58-214981 | 12/1983 | Japan | G06K 15/22 |
| 1-272267 | 10/1989 | Japan | H04N 1/46 |

OTHER PUBLICATIONS

Patent Abstracts of Japan, vol. 8, No. 68 (P-264), Mar. 30, 1984.
Patent Abstracts of Japan, vol. 14, No. 38 (E-878), Jan. 24, 1990.

*Primary Examiner*—Peter S. Wong
*Assistant Examiner*—Eric Frahm
*Attorney, Agent, or Firm*—Fitzpatrick, Cella, Harper & Scinto

[57] ABSTRACT

An image processing system includes a color reversing capability, and code data is received from a host computer via a reception buffer and analyzed. It the data includes a color reversing instruction, a logical operation is performed between bit patterns developed in bit-map RAM areas corresponding to yellow (Y), magenta (M) and cyan (C) inks or toners, and a bit pattern developed in a bit-map area corresponding to a black (K) ink or toner. The K bit pattern is cleared, and the bit patterns of the Y, M and C bit map areas that have been subjected to the logical operation are reversed, resulting in an attractive color reversal.

11 Claims, 14 Drawing Sheets

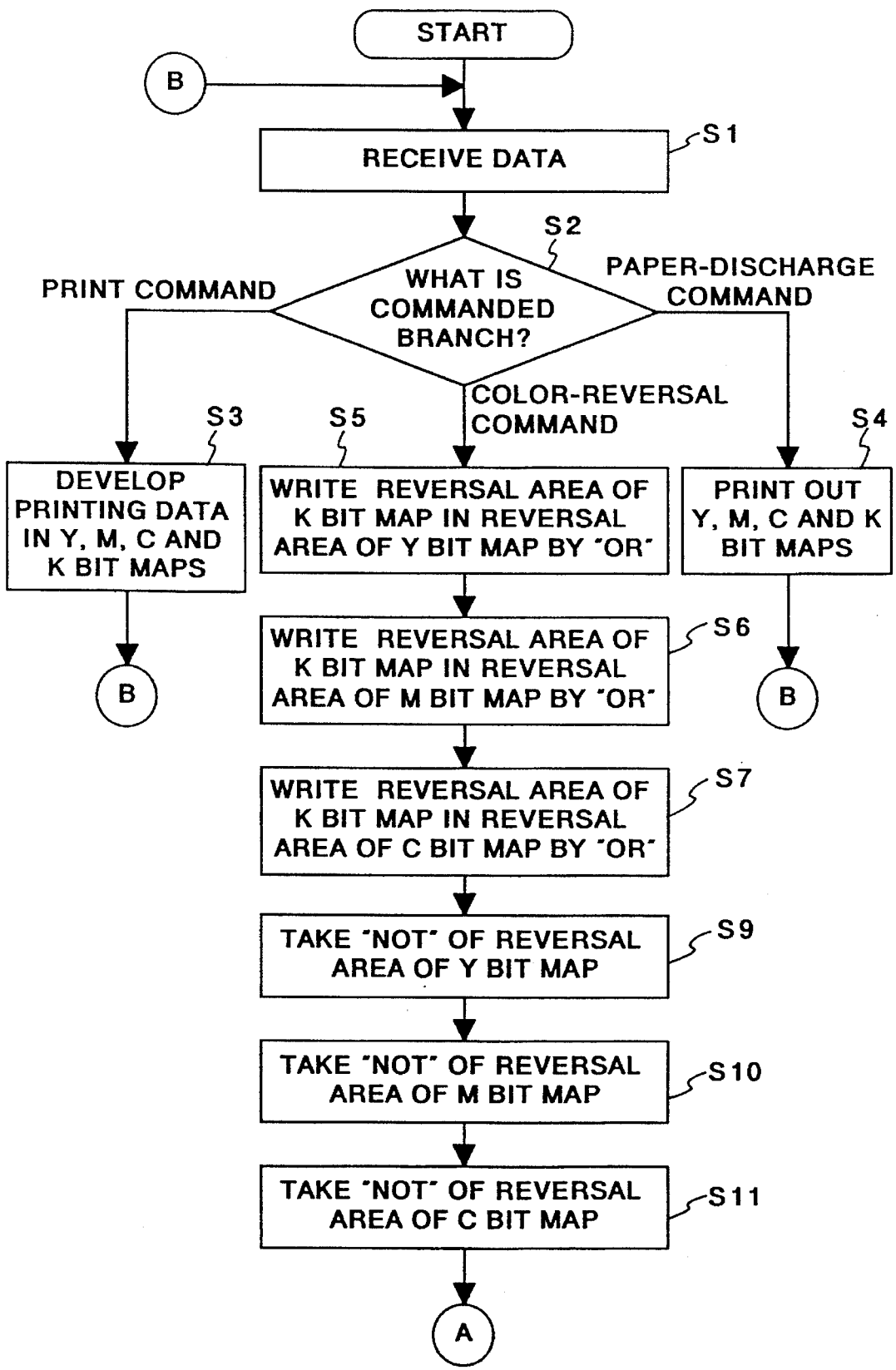
F I G. 6A

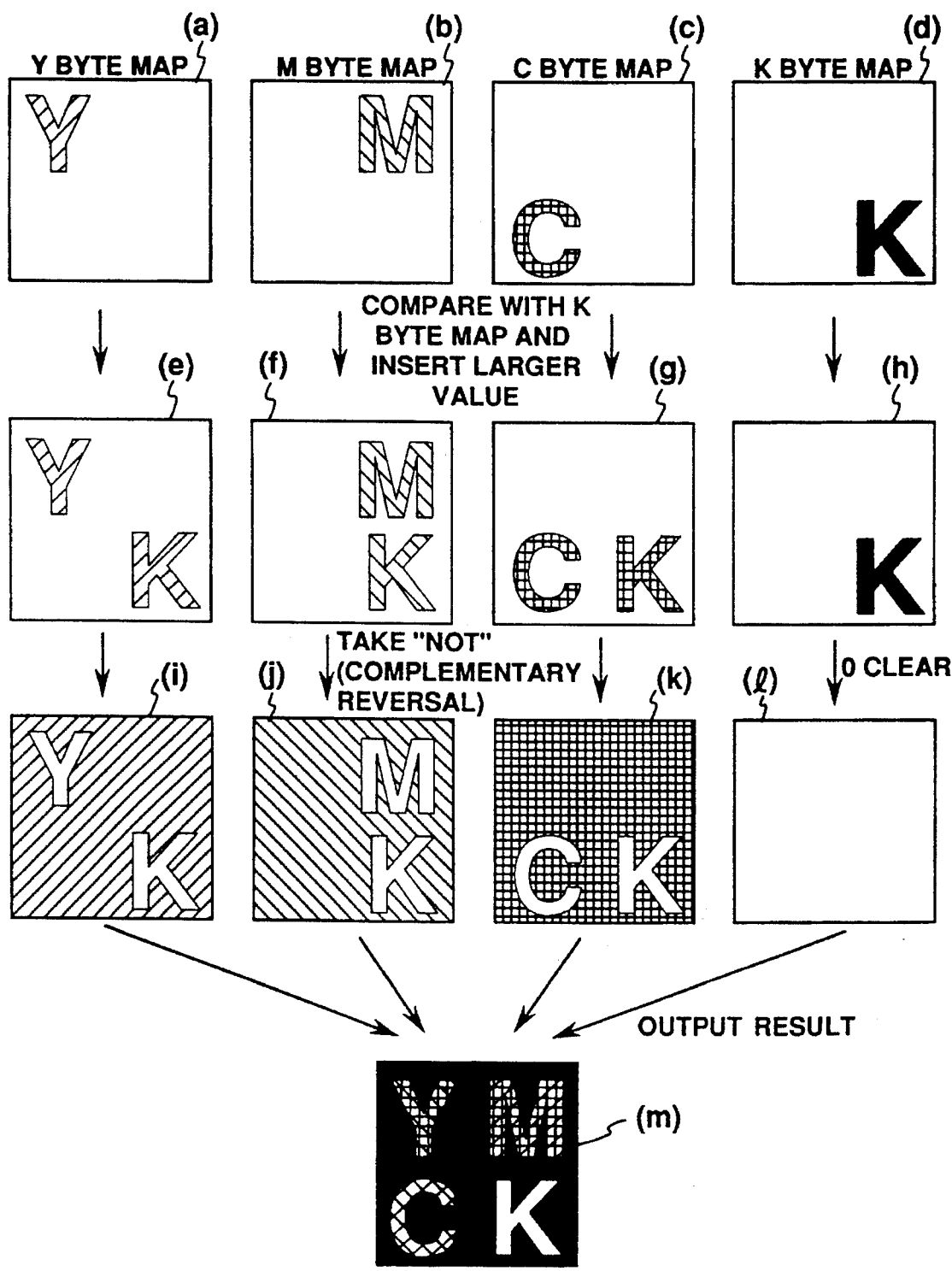
F I G. 10

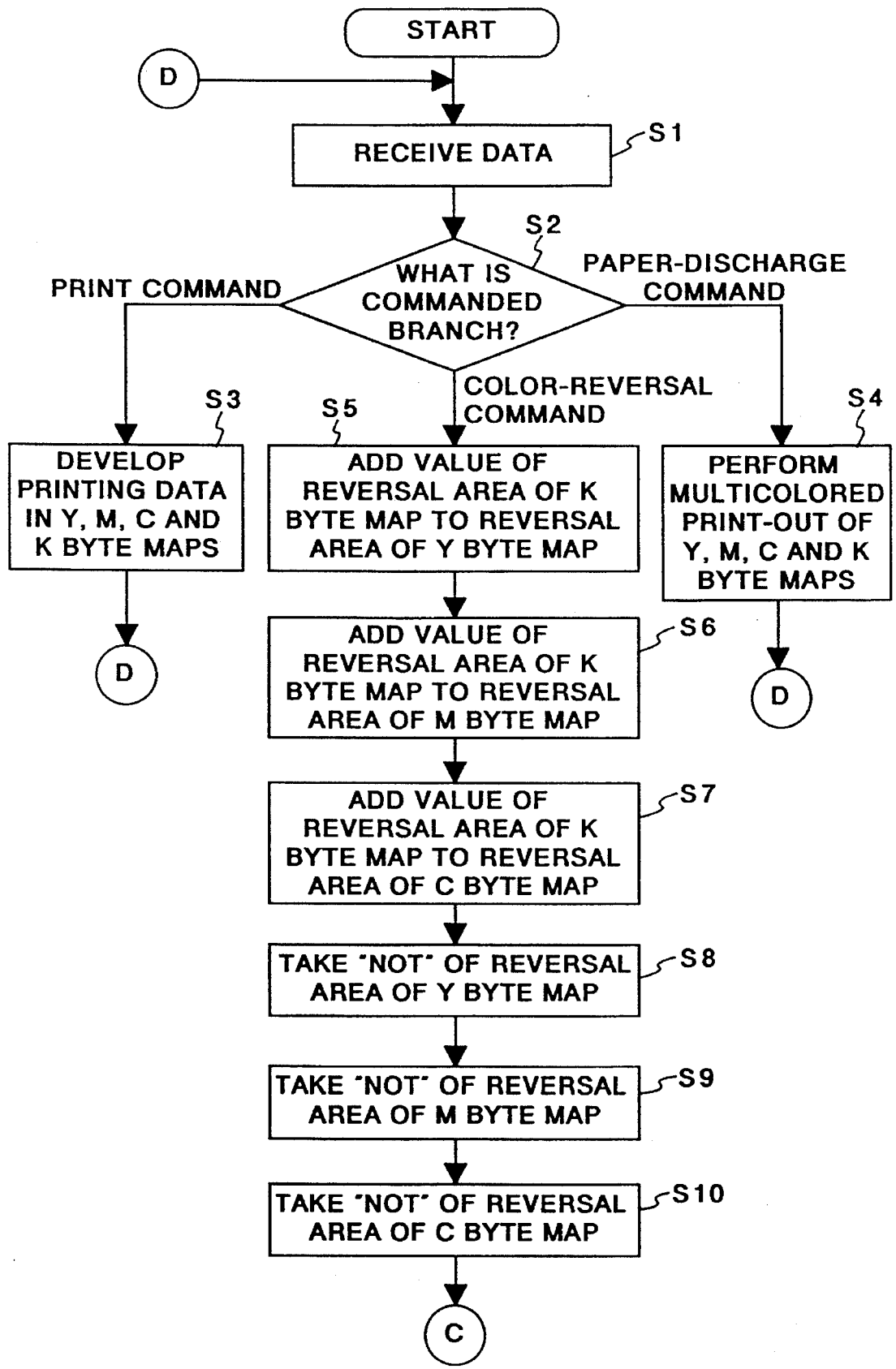
F I G. 11A

INFORMATION PROCESSING APPARATUS, AND METHOD OF REVERSING COLOR THEREIN

This application is a continuation of application Ser. No. 07/770,425 filed Oct. 3, 1991 abandoned.

BACKGROUND OF THE INVENTION

1. Field of the Invention

This invention relates to an image processing apparatus and, more particularly, to an image processing apparatus capable of outputting reversed colors using Y (yellow), M (magenta), C (cyan) and K (black) colorants. The invention relates also to a method of reversing color in this image processing apparatus.

2. Description of the Related Art

In a black-and-white binary printing apparatus in which a black-white reversal command is provided, a bit map within a designated range is reversed when the reversal command is received, whereby a black-white reversal is performed.

In a case where a black-white reversal is applied to a multicolor printing apparatus, such as a Y (yellow)-, M (magenta)- and C (cyan)-three-color printing apparatus, as shown in FIG. 2, Y, M and C bit maps are as illustrated in (a) through (c) of FIG. 2, where the characters Y, M, C and K represent yellow, magenta, cyan and black, respectively. The Y, M and C bit maps following a simple reversal become as shown in (d) through (f) of FIG. 2, and the outputted result is depicted in (g) of FIG. 2. More specifically, merely by reversing each bit map, Y→M+C (blue), M→Y+C (green), C→Y+M (red), K→white, and background →Y+M+C (black) are obtained, and a color reversal based upon complementary colors is substantially achieved.

However, when the above-described black-white reversal is applied, for example, to a YMCK four-color printing apparatus as shown in FIG. 3, merely reversing the Y, M, C and K-bit maps shown in (a) through (d) of FIG. 3 to provide the reversals of (e) through (h) of FIG. 3 and the output (i) of FIG. 3 results in Y→M+C+K (black), M→Y+C+K (black), C→Y+M+K (black), K→Y+M+C (black), and background→Y+M+C+K (black). Thus, a drawback is that all of the maps become pure black.

SUMMARY OF THE INVENTION

An object of the present invention is to provide an image processing apparatus, and a method of reversing color therein, in which a color reversal is made possible through a simple construction.

According to the present invention, the foregoing object is attained by providing an image processing apparatus for developing printing data into bit maps corresponding to a plurality of colorants, and performing printing, comprising color reversing means for performing a color reversal by executing a specific logic operation among the bit maps into which the printing data has been developed, and outputting printing data, which results from the logical operation, from each bit map.

Another object of the present invention is to provide an image processing apparatus capable of a wide variety of image editing.

Still another object of the present invention is to provide an image processing apparatus in which picture quality at the time of a negative-positive reversal is improved.

A further object of the present invention is to provide an image processing apparatus that is easy to operate.

A further object of the present invention is to provide a method of negative-positive reversal suited to high-speed processing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 6A and 6B show a flowchart illustrating color-reversal processing according to the second embodiment;

FIG. 10 is a diagram showing Y, M, C and K byte maps according to the third embodiment;

FIGS. 11A and 11B show a flowchart illustrating color-reversal processing according to the fourth embodiment.

DESCRIPTION OF THE PREFERRED EMBODIMENTS

Preferred embodiments according to the present invention will now be described in detail with reference to the accompanying drawings.

<First Embodiment>

Figure 1:
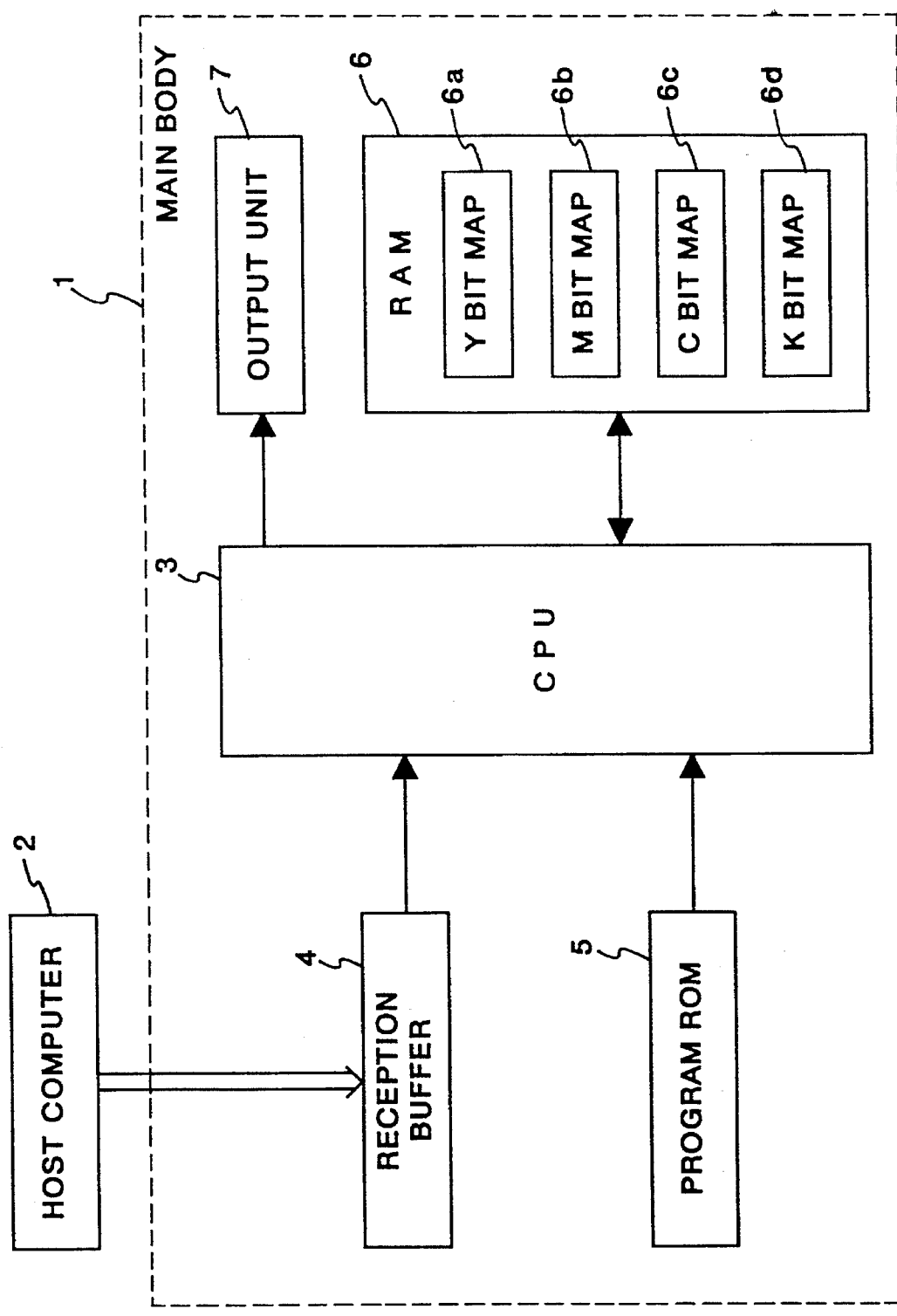
FIG. 1 is a simplified block diagram illustrating the construction of a YMCK four-color printing apparatus according to first and second embodiments of the invention.
Figure 2:
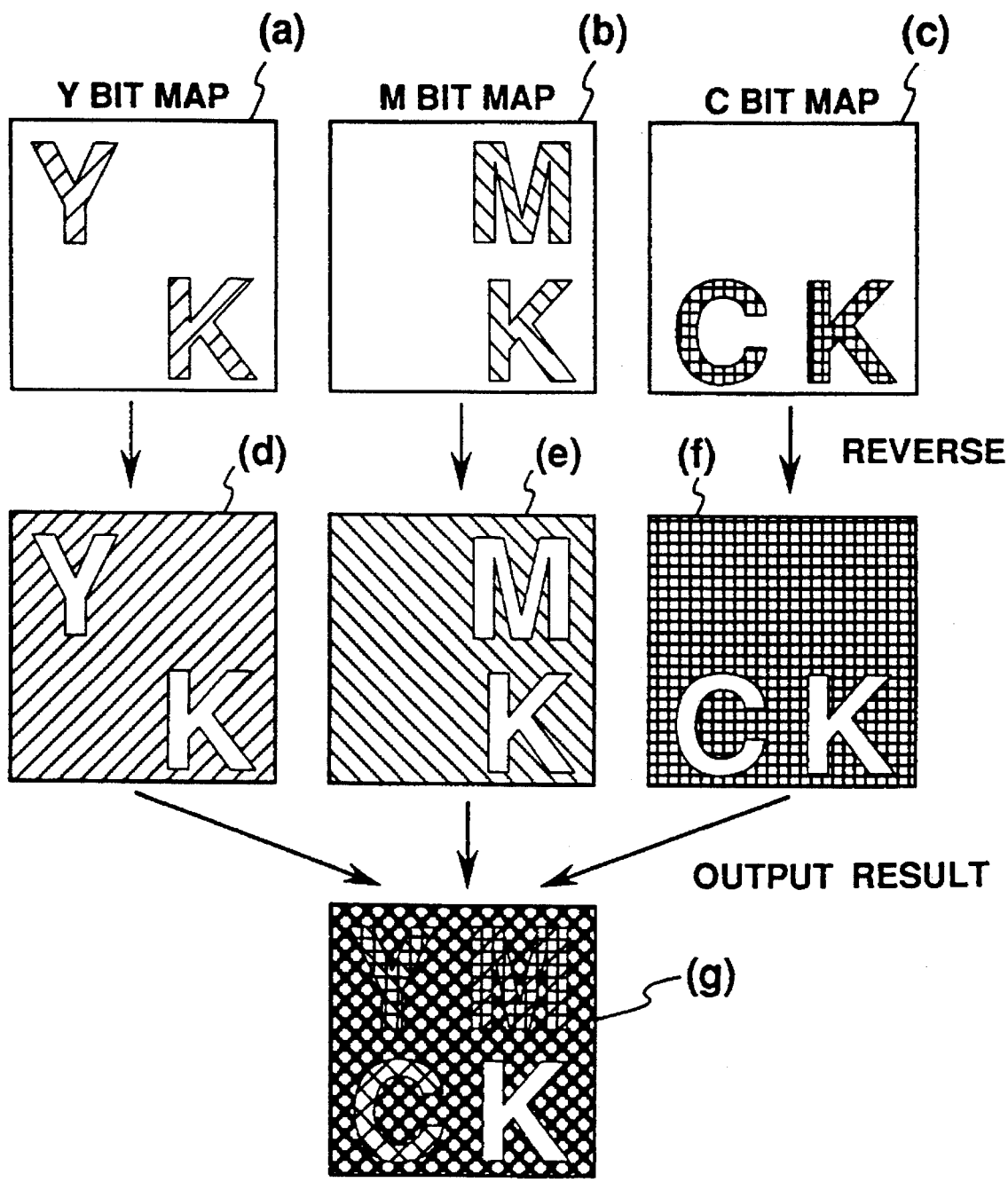
FIG. 2 is a diagram for describing color-reversal processing in a YMC three-color printing apparatus.
Figure 3:
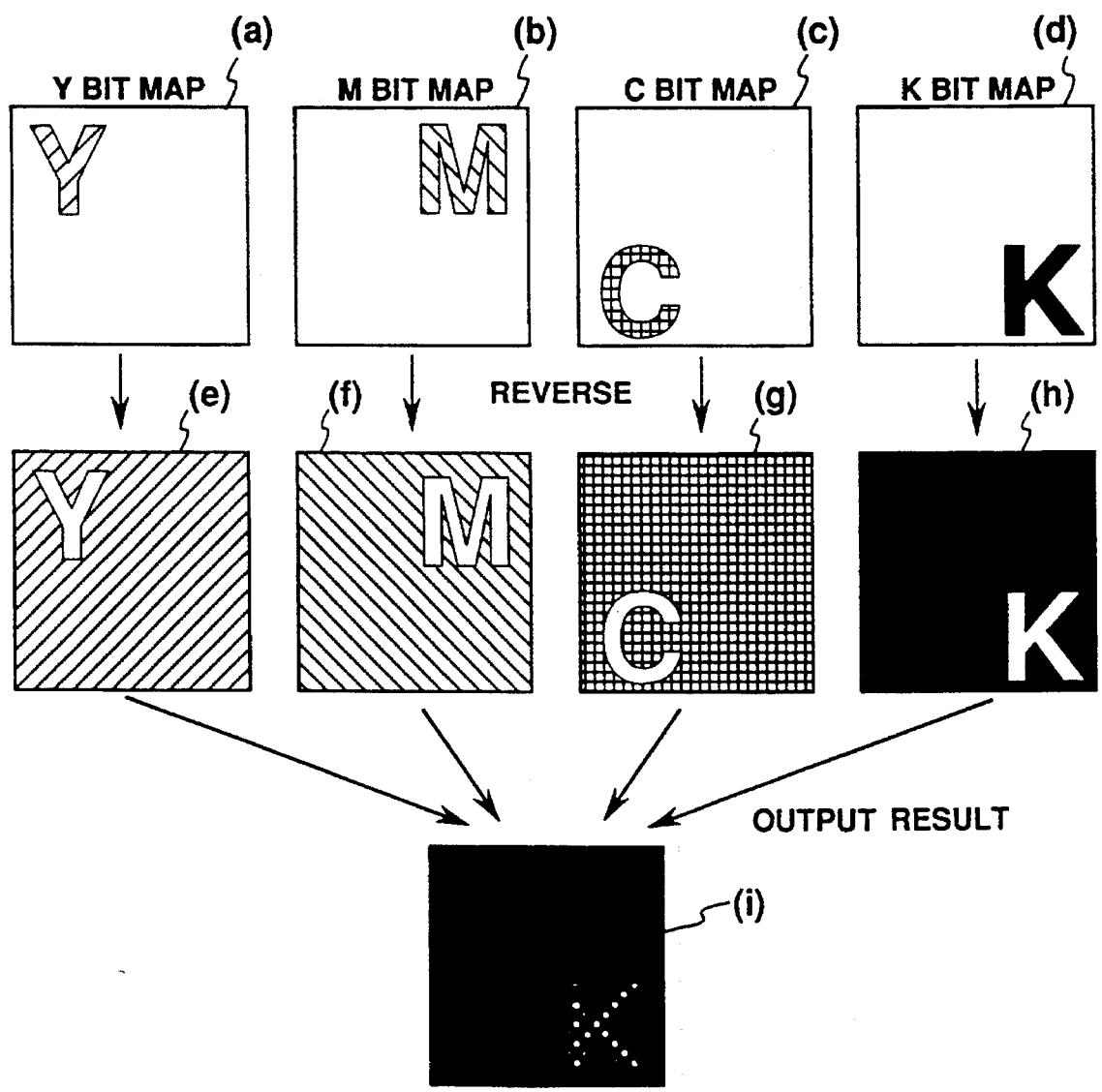
FIG. 3 is a diagram for describing color-reversal processing in a YMCK four-color printing apparatus.

FIG. 1 is a block diagram illustrating the construction of a Y (yellow)-, M (magenta)-, C (cyan)- and K (black)-four-color printing apparatus according to first and second embodiments of the invention.

As shown in FIG. 1, a YMCK four-color printing apparatus has a main body 1 connected to an external host computer 2 via a connector (not shown). The main body 1 is so adapted as to perform print-out upon receiving command data, which is indicative of a print instruction, color-reversal (i.e., negative-positive reversal) instruction and paper-discharge instruction, etc., from the host computer 2. The main body 1 includes a CPU 3 for performing overall control in accordance with various programs, described below, a reception buffer 4 for accumulating received data, such as data indicative of the print instruction, color-reversal instruction and paper-discharge instruction, etc., from the host computer 2, a ROM element 5 which stores a series of control procedures (programs) executed by the CPU 3, a RAM element 6 used as a working area when the CPU 3 executes programs, an output unit 7 which actually performs print-out, and a power-supply device, which is not shown. Negative-Positive reversal includes conversion from a negative image to a positive image to a positive image and conversion from a positive image to a negative image.

The output unit 7 is constituted by a color laser-beam printer, a color ink-jet printer or a color thermal-transfer printer, etc. It is permissible also to use a bubble-jet printer having a head of the type which jets droplets utilizing film boiling that relies upon thermal energy, as disclosed in the specification of U.S. Pat. No. 4,723,129.

Bit-map areas 6a, 6b, 6c, 6d for the colors YMCK are defined within the RAM element 6, and bit patterns conforming to the input data are developed in respective ones of these areas.

Figure 4:
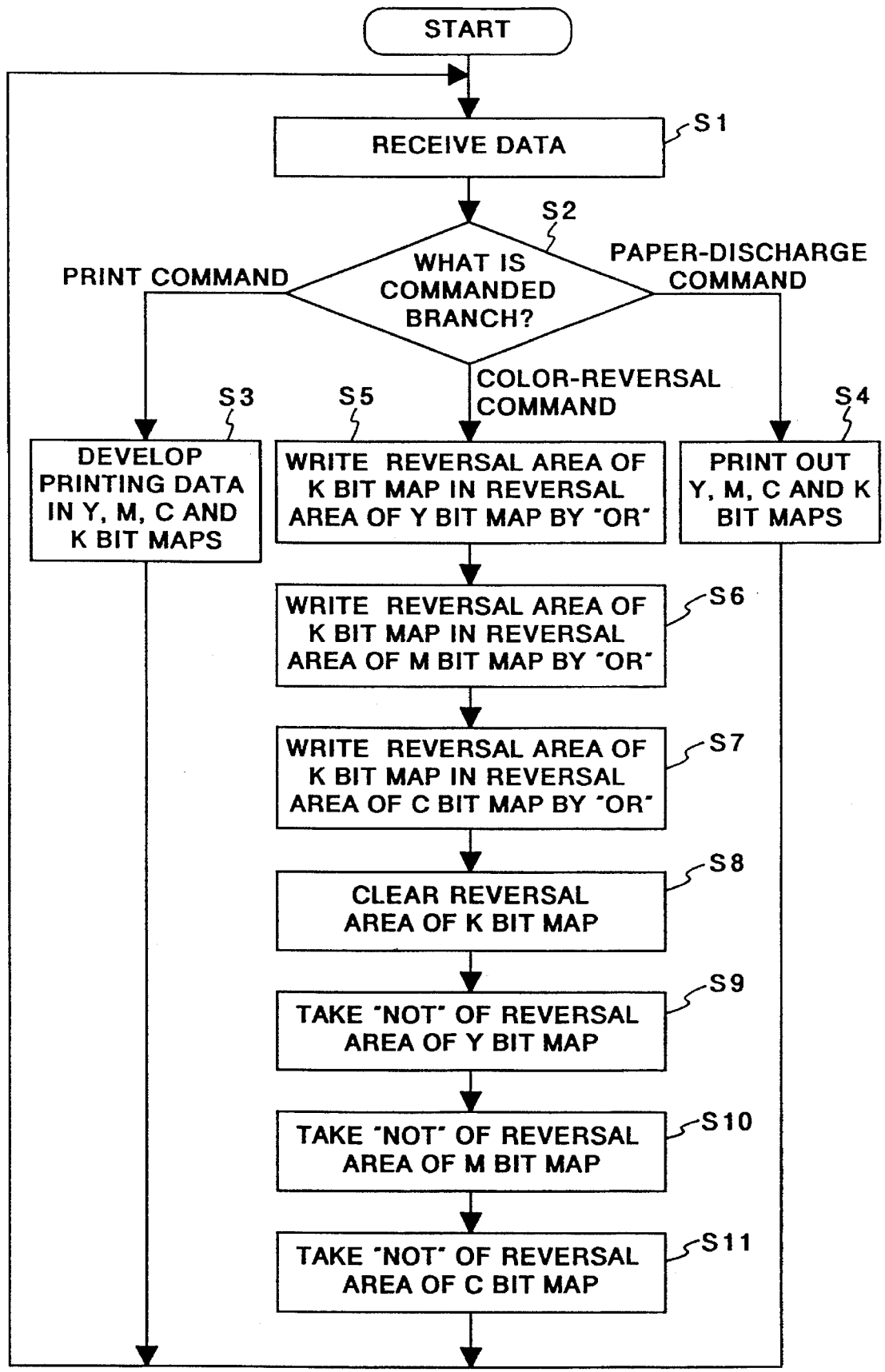
FIG. 4 is a flowchart illustrating color-reversal processing according to the first embodiment.
Figure 5:
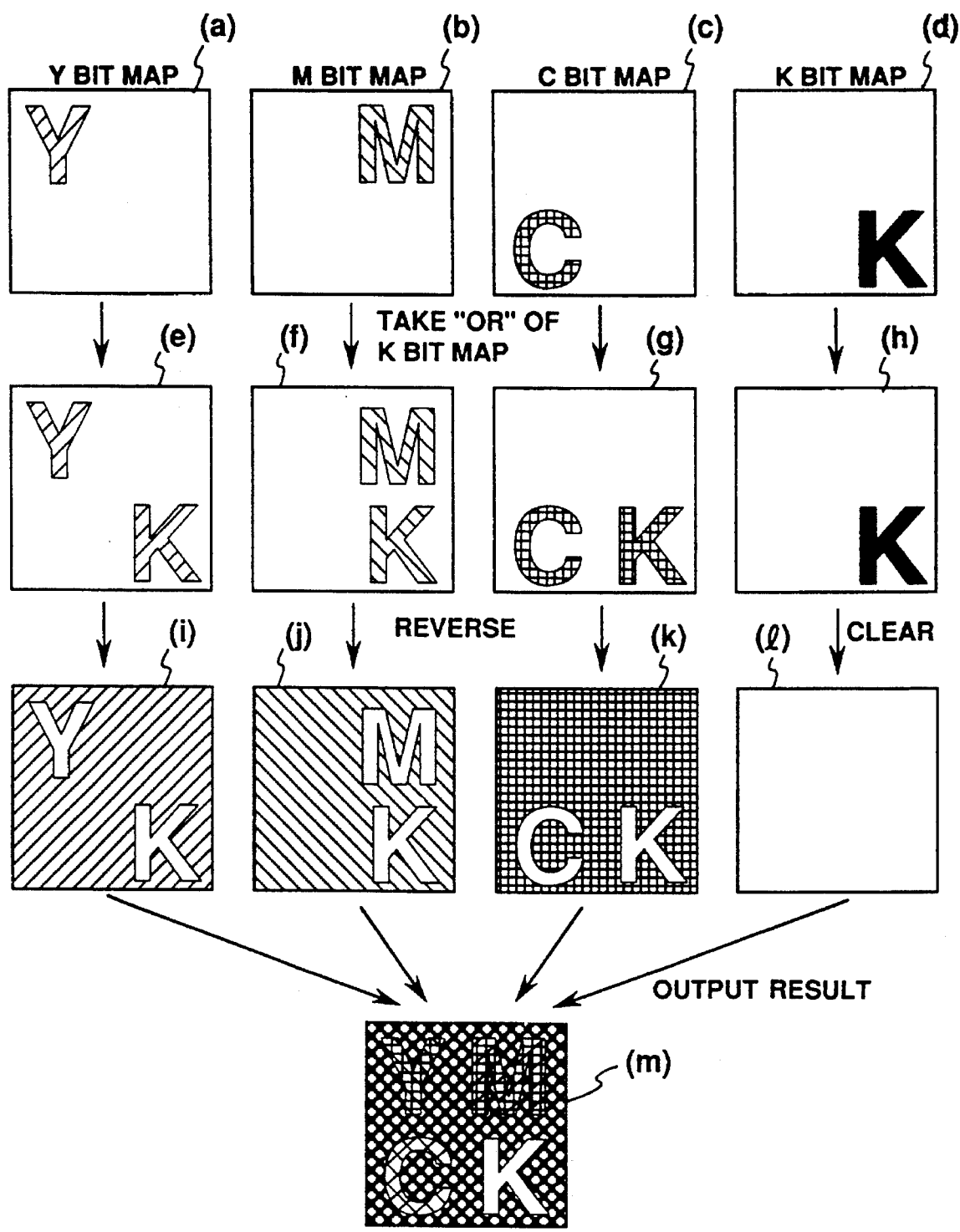
FIG. 5 is a diagram showing Y, M, C and K bit maps according to the first embodiment.

The processing executed by the printing apparatus 1 will now be described in accordance with the flowchart shown in FIG. 4.

Logical operations (described below) such as AND, OR, NOT and X-OR (exclusive-OR) concerning each of the bit maps are executed by the CPU 3 in accordance with programs stored in the ROM element 5.

When power is introduced to the apparatus, the CPU 3 first executes the processing of step S1, at which data from the host computer 2 is received and the received data is stored in the reception buffer 4. One unit code of data is read from the buffer 4. This is followed by the processing of step S2, at which the data read at step S1 is analyzed and processing branches to command processing which corresponds to the results of analysis. For example, processing branches to step S3 in case of a print instruction, to step S4 in case of a paper-discharge instruction, and to a step S5 in case of a color-reversal instruction.

In case of a print instruction, the printing data is developed in the bit-map areas 6a, 6b, 6c, 6d of Y, M, C, K at step S3, after which the program returns to step S1. In case of the paper-discharge instruction, the printing data developed in the bit-map areas 6a, 6b, 6c, 6d of Y, M, C, K at step S3 is outputted to the output unit 7 in regular order to obtain a YMCK color print-out at step S4. In case of the color-reversal instruction, a reversal designation area in the K bit map 6d is written by an OR in a reversal designation area in the Y bit map 6a at step S5.

Similarly, a reversal designation area in the K bit map 6d is written by an OR in a reversal designation area in the M bit map 6b at step S6, and a reversal designation area in the K bit map 6d is written by an OR in a reversal designation area in the C bit map 6c at step S7.

By virtue of the foregoing processing, the YMCK bit maps shown in FIGS. 5(a) through (d) become as shown in FIGS. 5(e) through (h).

Next, the reversal designation area of the K bit map 6d is cleared at step S8, and the reversal designation area of the Y bit map 6a is reversed by a NOT operation at step S9. Similarly, the reversal designation area of the M bit map 6b is reversed by a NOT operation at step S10, and the reversal designation area of the C bit map 6c is reversed by a NOT operation at step S11.

By virtue of the foregoing processing, the bit maps of the colors YMCK become as shown in FIGS. 5(i) through (l). When the state of each bit map is outputted, the outputted result shown in FIG. 5(m) is obtained. Specifically, we have character Y→M+C (blue), character M→Y+C (green), character C→Y+M (red), character K→ white, and background →Y+M+C (black), so that the desired color reversal is obtained.

Thereafter, the program returns to step S1.

In accordance with this embodiment, as described above, a logical operation is performed between each of the bit maps of Y, M, C and the bit map of K, after which the bit maps of Y, M and C are reversed. As a result, a highly attractive color reversal can be achieved.

<Second Embodiment>

Figure 6B:
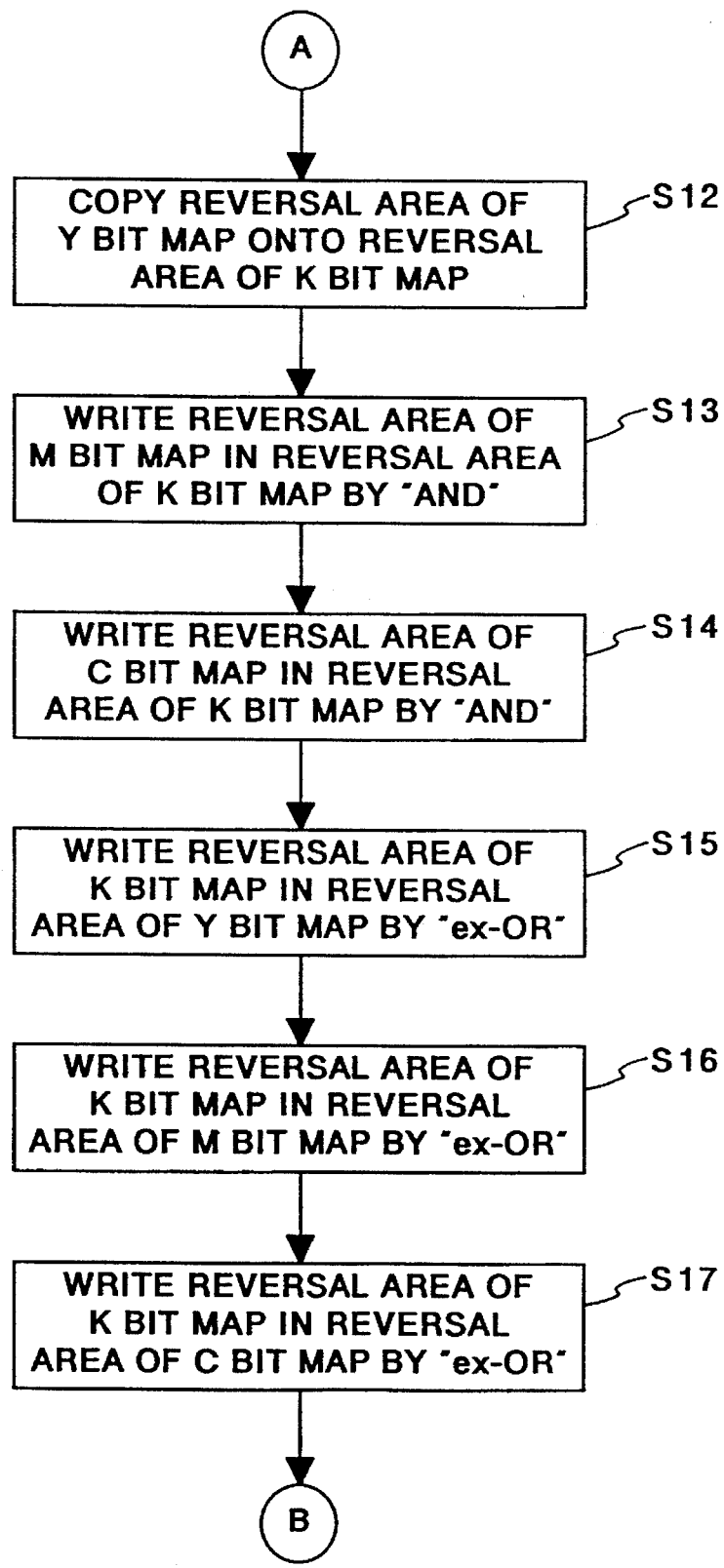

A second embodiment of the present invention will now be described with reference to FIGS. 6A, 6B and 7.

The construction of the apparatus according to this embodiment is the same as in the first embodiment, and therefore reference should be had to FIG. 1 for the block diagram and contents thereof. FIGS. 6A and 6B show a flowchart illustrating the processing procedure, and FIG. 7 shows the Y, M, C and K bit maps illustrating the results of processing.

When power is introduced to the main body 1, the CPU 3 first executes the processing of step S1, at which data from the host computer 2 is received and the received data is stored in the reception buffer 4. One unit code of data is read from the buffer 4. This is followed by the processing of step S2, at which the data read at step S1 is analyzed and processing branches to command processing which corresponds to the results of analysis. For example, processing branches to step S3 in case of a print instruction, to step S4 in case of a paper-discharge instruction, and to a step S5 in case of a color-reversal instruction.

In case of a print instruction, the printing data is developed in the bit-map areas 6a, 6b, 6c, 6d of Y, M, C, K at step S3, after which the program returns to step S1. In case of the paper-discharge instruction, the printing data developed in the bit-map areas 6a, 6b, 6c, 6d of Y, M, C, K at step S3 is outputted to the output unit 7 in regular order to obtain a YMCK color print-out at step S4. In case of the color-reversal instruction, a reversal designation area in the K bit map 6d is written by an OR in a reversal designation area in the Y bit map 6a at step S5.

Similarly, a reversal designation area in the K bit map 6d is written by an OR in a reversal designation area in the M bit map 6b at step S6, and a reversal designation area in the K bit map 6d is written by an OR in a reversal designation area in the C bit map 6c at step S7.

By virtue of the foregoing processing, the YMCK bit maps shown in FIGS. 7(a) through (d) become as shown in FIGS. 7(e) through (h).

Next, the reversal designation area of the Y bit map is reversed by a NOT operation at step S9, the reversal designation area of the M bit map is reversed by a NOT operation at step S10, and the reversal designation area of the C bit map 6a is reversed by a NOT operation at step S11. Step S12 calls for the reversal designation area of the Y bit map to be copied onto the reversal designation area of the K bit map. Thus, the maps of Y, M, C and K are as illustrated in (i) through (l) of FIG. 7.

Next, at step S13, the reversal area in the M bit map 6b is written by an AND operation in the reversal area of the K bit map 6. Similarly, the reversal designation area in the C bit map 6c is written by an AND operation in the reversal designation area of the K bit map 6 at step S14. Thus, the K bit map 6d becomes as shown in FIG. 7(p).

This is followed by step S15, at which the conversion designation area in the K bit map 6d is written by an XOR operation in the reversal designation area in the Y bit map 6a. Then, at step S16, the conversion designation area in the K bit map 6d is written by an XOR operation in the reversal designation area in the M bit map 6b. Next, the conversion designation area in the K bit map 6d is written by an XOR operation in the reversal designation area in the C bit map 6c.

Figure 7:
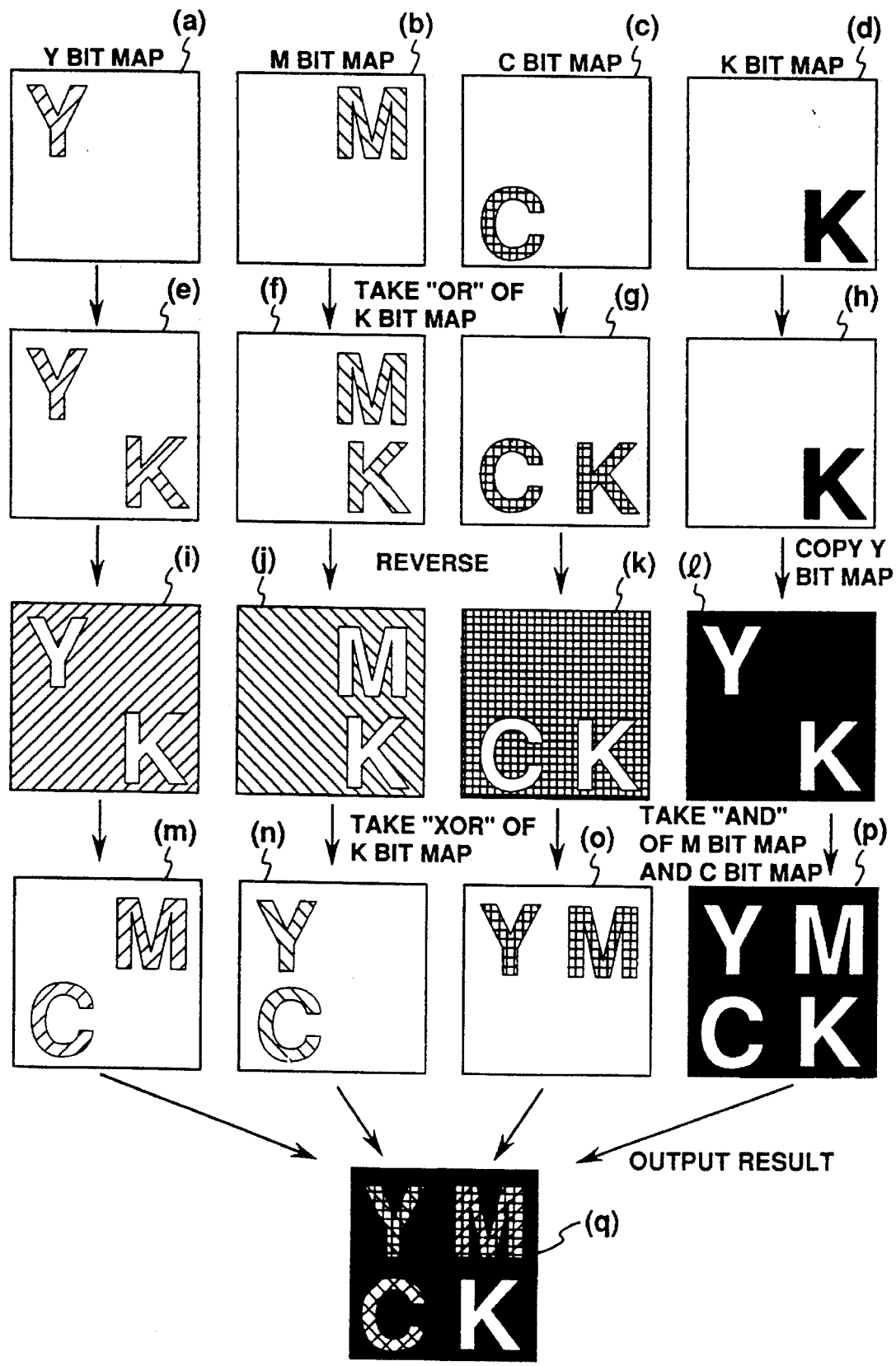
FIG. 7 is a diagram showing Y, M, C and K bit maps according to the second embodiment.

Thus, the Y, M and C bit maps become as depicted in FIGS. 7(*m*) through (*o*).

By virtue of the foregoing processing, FIG. 7 (*q*) is obtained when the Y, M, C and K bit maps are outputted, and we have character Y→M+C (blue), character M→Y+C (green), character C→Y+M (red), character K→white, and background →K (black), so that the desired color reversal is obtained.

Thereafter, the program returns to step S1 and the apparatus awaits for receipt of data.

In accordance with the second embodiment described above, the K bit map is reconstructed by the results of the logical operations applied to the Y, M and C bit maps, and logical operations are performed between the K bit map each of the Y, M and C bit maps. As a result, a highly attractive color reversal can be achieved.

It should be noted that whereas a reversed result which does not employ the K (black) bit map is obtained in the first embodiment described above, the reversal in the second embodiment employs the K (black) bit map in addition to the other bit maps, and therefore color reproducibility is further enhanced.

Further, it is permissible for the reversal designation areas to be designated by a command or to be handled as bit maps in their entirety.

Moreover, it is permissible for the logical operations such as OR, AND and XOR to be implemented by hardware, in which case execution speed is raised.

<Third Embodiment>

A third embodiment of a multivalued printing apparatus according to the present invention will be described with reference to FIGS. 8, 9 and 10.

Figure 8:
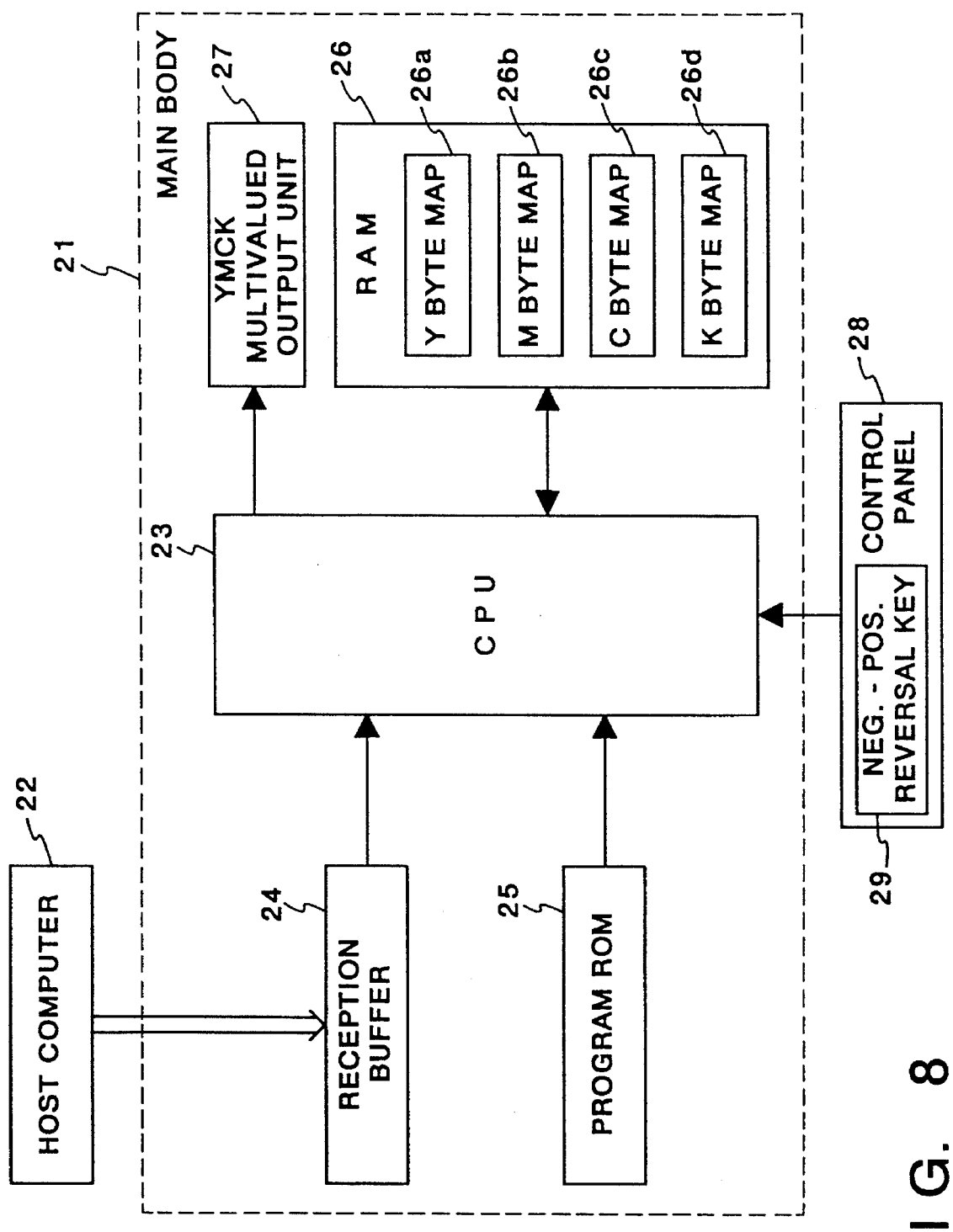
FIG. 8 is a simplified block diagram illustrating the construction of a YMCK four-color printing apparatus according to third and fourth embodiments of the invention.
Figure 9:
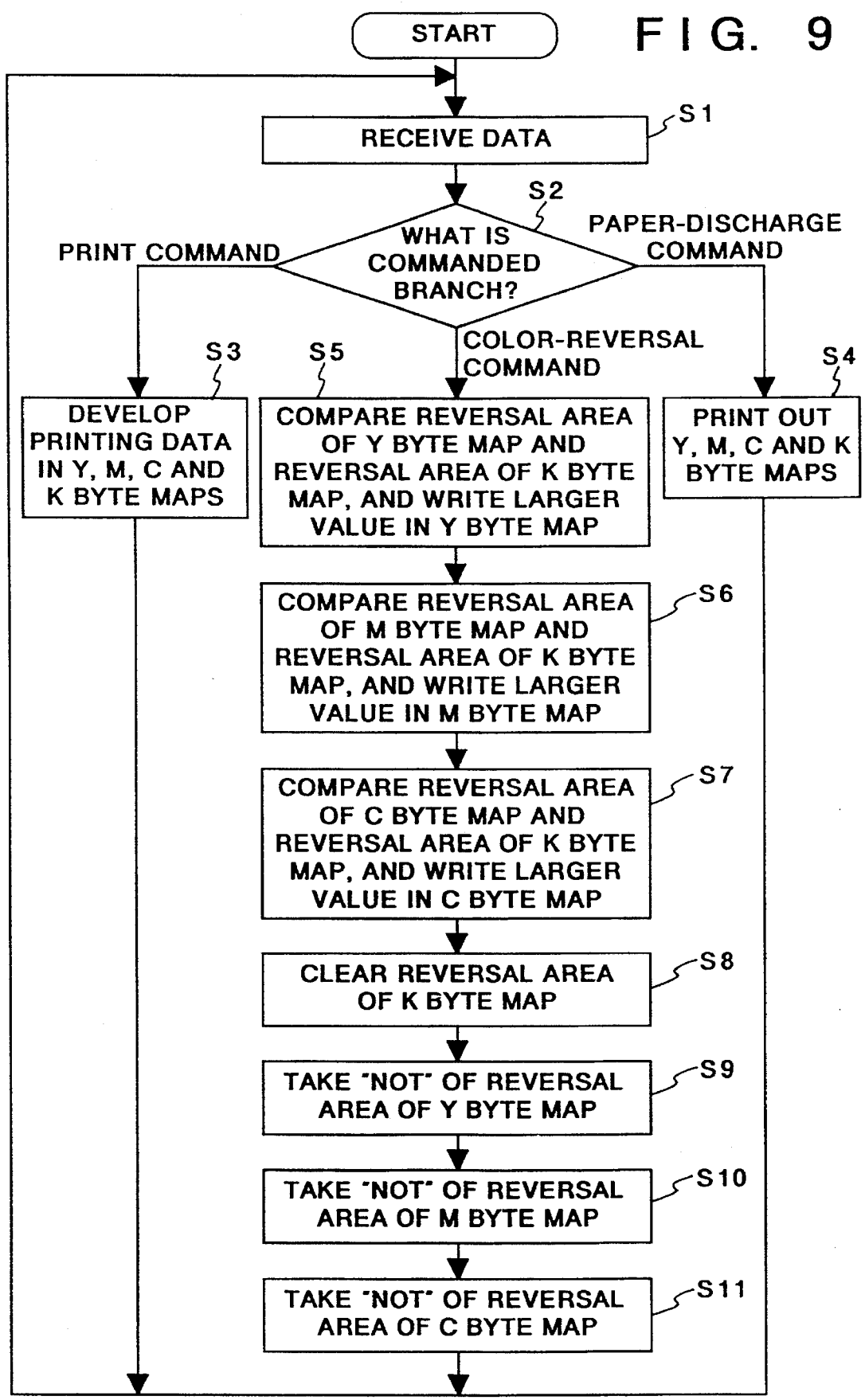
FIG. 9 is a flowchart illustrating color-reversal processing according to the third embodiment.

FIG. 8 is a block diagram illustrating the construction of a Y (yellow)-, M (magenta)-, C (cyan)- and K (black)-four-color printing apparatus according to third and fourth embodiments of the invention.

As shown in FIG. 1, a YMCK four-color printing apparatus has a main body 21 connected to an external host computer 22 via a connector (not shown). The main body 1 is so adapted as to perform print-out upon receiving command data, which is indicative of a print instruction, color-reversal instruction and paper-discharge instruction, etc., from the host computer 22. The main body 1 includes a CPU 23 for performing overall control in accordance with various programs, described below, a reception buffer 24 for accumulating received data, such as data indicative of the print instruction, color-reversal instruction and paper-discharge instruction, etc., from the host computer 22, a ROM element 25 which stores a series of control procedures (programs) executed by the CPU 23, a RAM element 26 used as a working area when the CPU 23 executes programs, a YMCK multivalued output unit 27 which actually performs print-out, and a power-supply device, which is not shown.

Byte-map areas 26*a*, 26*b*, 26*c*, 26*d* for the colors YMCK are defined within the RAM element 26, and byte patterns conforming to the input data are developed in respective ones of these areas. Numeral 28 denotes a control panel provided on the printer and having negative-positive reversal key 29 which is used so that entry can be gained to the flow of a negative-positive reversal, described below, manually on the printer side.

The processing executed by the printing apparatus 21 will now be described in accordance with the flowchart shown in FIG. 9.

When power is introduced to the main body 21, the CPU 23 first executes the processing of step S1, at which data from the host computer 22 is received and the received data is stored in the reception buffer 24. One unit code of data is read from the buffer 24. This is followed by the processing of step S2, at which the data read at step S1 is analyzed and processing branches to command processing which corresponds to the results of analysis. For example, processing branches to step S3 in case of a print instruction, to step S4 in case of a paper-discharge instruction, and to a step S5 in case of a color-reversal instruction.

In case of a print instruction, the printing data is developed in the byte-map areas 26*a*, 26*b*, 26*c*, 26*d* of Y, M, C, K at step S3, after which the program returns to step S1. In case of the paper-discharge instruction, the printing data developed in the byte-map areas 26*a*, 26*b*, 26*c*, 26*d* of Y, M, C, K at step S3 is outputted to the YMCK multivalued output unit 27 in regular order to obtain a YMCK color multivalued print-out at step S4.

In case of the color-reversal instruction, the value of a reversal designation area in the Y byte map 26*a* and the value of a reversal designation area in the K byte map 26*d* are compared at step S5, and the larger value is written in the reversal designation area in the Y byte map 26*a*.

Similarly, the value of a reversal designation area in the M byte map 26*b* and the value of a reversal designation area in the M byte map 26*b* are compared at step S6, and the larger value is written in the reversal designation area in the M byte map 26*b*. Further, the value of a reversal designation area in the C byte map 26*c* and the value of a reversal designation area in the K byte map 26*d* are compared at step S7, and the larger value is written in the reversal designation area in the C byte map 26*c*.

By virtue of the foregoing processing, the YMCK byte maps shown in FIGS. 10(*a*) through (*d*) become as shown in FIGS. 10(*e*) through (*h*).

Next, the reversal designation area of the K byte map 26*d* is cleared at step S8, and the reversal designation area of the Y byte map 26*a* is reversed by a NOT operation at step S9. Similarly, the reversal designation area of the M byte map 26*b* is reversed by a NOT operation at step S10, and the reversal designation area of the C byte map 26*c* is reversed by a NOT operation at step S11.

By virtue of the foregoing processing, the byte maps of the colors YMCK become as shown in FIGS. 10 (*i*) through (*l*). When the state of each byte map is outputted, the outputted result shown in FIG. 10 (*m*) is obtained. Specifically, we have character Y (Y255, M0, C0, K0)→blue (Y0, M255, C255, K0); character M (Y0, M255, C0, K0)→green (Y255, M0, C255, K0); character C (Y0, M0, C255, K0)→ red (Y255, M255, C0, K0); character K (Y0, M0, C0, K255)→white (Y0, M0, C0, K0); and background→(Y0, M0, C0, K0)→black (Y255, M255, C255, K0). Thus the desired color reversal is obtained.

The program then returns to step S1.

Thus, in accordance with the third embodiment, as described above, the values of each of the Y, M and C byte maps are compared with the value of the K byte map and the larger values are written, after which the Y, M, C and K maps are reversed. As a result, a highly attractive color reversal can be realized.

<Fourth Embodiment>

Figure 11B:
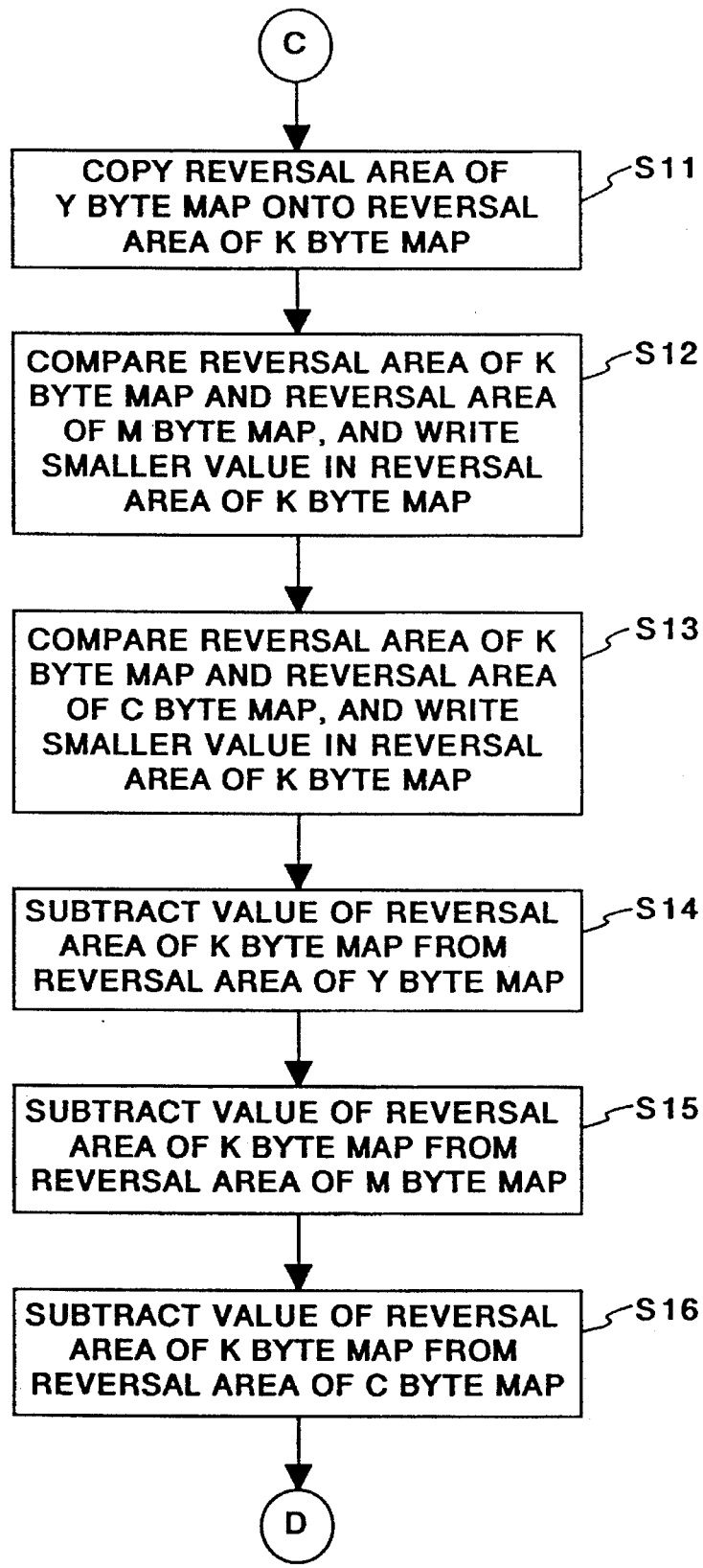

A fourth embodiment of the present invention will now be described with reference to FIGS. 11A, 11B and 12.

The construction of the apparatus according to this embodiment is the same as in the third embodiment, and therefore reference should be had to FIG. 8 for the block diagram and contents thereof. FIGS. 11A and 11B show a flowchart illustrating the processing procedure, and FIG. 12 shows the Y, M, C and K byte maps illustrating the results of processing.

When power is introduced to the main body 21, the CPU 23 first executes the processing of step S1, at which data from the host computer 22 is received and the received data is stored in the reception buffer 24. One unit code of data is read from the buffer 4. This is followed by the processing of step S2, at which the data read at step S1 is analyzed and processing branches to command processing which corresponds to the results of analysis. For example, processing branches to step S3 in case of a print instruction, to step S4 in case of a paper-discharge instruction, and to a step S5 in case of a color-reversal instruction.

In case of a print instruction, the printing data is developed in the byte-map areas 26a, 26b, 26c, 26d of Y, M, C, K at step S3, after which the program returns to step S1. In case of the paper-discharge instruction, the printing data developed in the byte-map areas 26a, 26b, 26c, 26d of Y, M, C, K at step S3 is outputted to the YMCK multivalued output unit 27 in regular order to obtain a YMCK color multivalued print-out at step S4.

In case of the color-reversal instruction, the value of a reversal designation area in the K byte map 26d is added to a reversal designation area in the Y byte map 26a at step S5.

Similarly, the value of the reversal designation area in the K byte map 26d is added to a reversal designation area in the M byte map 26b at step S6, and the value of the reversal designation area in the K byte map 26d is added to a reversal designation area in the C byte map 26c at step S7.

Figure 12:
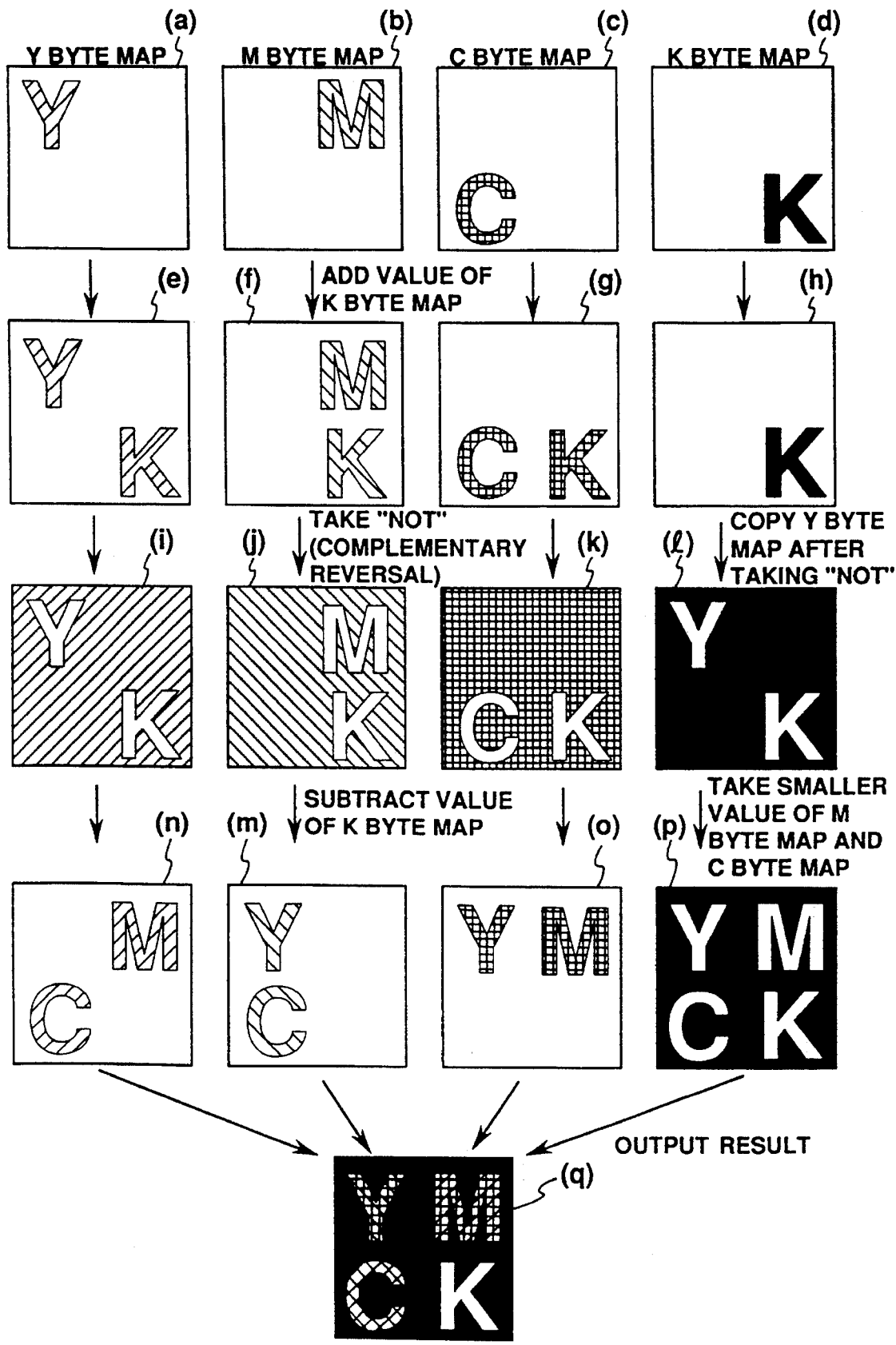
FIG. 12 is a diagram showing Y, M, C and K byte maps according to the fourth embodiment.

By virtue of the foregoing processing, the YMCK byte maps shown in FIGS. 12 (a) through (d) become as shown in FIGS. 12(e) through (h).

Next, the reversal designation area of the Y byte map is reversed by a NOT operation at step S8, the reversal designation area of the M byte map 26b is reversed by a NOT operation at step S9, and the reversal designation area of the C byte map 26c is reversed by a NOT operation at step S10. Step S11 calls for the value of the reversal designation area of the Y byte map 26a to be copied onto the reversal designation area of the K byte map 26d. Thus, the maps of Y, M, C and K are as illustrated in (i) through (l) of FIG. 12.

Next, at step S12, the value of the reversal area in the K byte map 26d and the value of the reversal area of the K byte map 26b are compared, and the smaller value is written in the reversal area in the K byte map 26d. Similarly, the value of the reversal area in the K byte map 26d and the value of the reversal area of the C byte map 26c are compared, and the smaller value is written in the reversal area in the K byte map 26d at step S13. Thus, the K byte map 26d becomes as shown in FIG. 12 (p).

This is followed by step S14, at which the value of the K byte map 26d is subtracted from the value of the conversion designation area in the Y byte map 26a, then by step S15, at which the value of the K byte map 26d is subtracted from the value of the conversion designation area in the M byte map 26b, and then by step S16, at which the value of the K byte map 26d is subtracted from the value of the conversion designation area in the C byte map 26c.

Thus, the Y, M, C and K byte maps become as depicted in FIGS. 12 (m) through (p).

By virtue of the foregoing processing, FIG. 12 (g) is the result when the Y, M, C and K byte maps obtained are outputted. Specifically, we have character Y (Y255, M0, C0, K0)→blue (Y0, M255, C255, K0); character M (Y0, M255, C0, K0)→green (Y255, M0, C255, K0); character C (Y0, M0, C255, K0)→red (Y255, M255, C0, K0); character K (Y0, M0, C0, K255)→white (Y0, M0, C0, K0); and background→(Y0, M0, C0, K0)→black (Y255, M255, C255, K0). Thus the desired color reversal is obtained.

Following the foregoing, the program returns to step S1 and the apparatus awaits for receipt of data.

In accordance with the fourth embodiment described above, the value of the K byte map is added to each of the Y, M and C byte maps, after which the Y, M and C byte maps are reversed and the Y byte map is copied onto the K byte map. The C and M byte maps are then each compared with the K byte map, and the smaller values are written in the K byte map, after which the value of the K byte map is subtracted from the values of the Y, M and C byte maps. As a result, a highly attractive reversal can be achieved.

In the foregoing embodiments, the logical operations for negative-positive reversal are executed by a CPU. However, a hardware arrangement composed of a gate array or the like can be used to implement the logical operations if desired. This will make it possible to speed up processing.

The function for the negative-positive reversal may be provided on the side of the host computer. More specifically, an arrangement can be adopted in which software for executing the negative-positive reversal method of the present invention is stored on a magnetic recording medium and the above-mentioned host computer is made to execute the reversal method by the software.

In addition, the output unit (printer) 7 may be made independent from the processor which executes the negative-positive reversal of the invention.

Further, the source of the plural color-component signals produced can be code data sent from the host computer, or the source can be image data. The color components of an image may be R, G, B; Y, M, C; or M, C, K.

Thus, in accordance with the embodiments described above, it is possible to provide a multicolor printing apparatus capable of performing a high-quality color reversal through a simple construction.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for developing printing data into a memory of a plurality of planes, each plane corresponding to one of a plurality of color components including yellow, magenta, cyan and black, said apparatus comprising:

developing means for developing printing data for the plurality of planes;

color reversing means for performing a negative-positive reversal by executing a specific logical operation among the planes which have been stored in the memory, and outputting color-reversed printing data which results from the logical operation; and supply means for selectively supplying said printing data developed by said developing means and said color-reversed printing data output from said color reversing means for an image forming apparatus, wherein the specific logical operation is performed at least between a black component and other color components.

2. The apparatus according to claim 1, wherein said color reversing means performs an OR operation between reversal areas of the respective planes of yellow, magenta and cyan and a reversal area of the plane of black, and clears the reversal area of the plane of black.

3. The apparatus according to claim 1, wherein said color reversing means reconstructs the plane of black by results of the logical operation applied to the planes of yellow, magenta and cyan, and performs a logical operation between the plane of black and the planes of each of yellow, magenta and cyan.

4. The apparatus according to claim 3, wherein said color reversing means performs an AND operation between a reversal area of the respective planes of yellow, magenta and cyan and performs an exclusive-OR operation between the reversal areas of the respective planes of yellow, magenta and cyan and the reversal area of the plane of black.

5. A method of reversing color of printing data developed in a memory of a plurality of planes, each plane corresponding to a plurality of color components including yellow, magenta, cyan and black, comprising the steps of:

developing printing data consisting of the plurality of color components;

storing the developed printing data for the plurality of planes in a memory;

performing a negative-positive reversal by executing a specific logical operation among the planes which have been stored in the memory and outputting color-converted printing data, which results from the logical operation; and selectively supplying the printing data developed in said developing step and color-converted printing data output in said performing step for an image forming apparatus, wherein the specific logical operation is performed at least between black component and other color components.

6. An image processing apparatus comprising:

receiving means for receiving transmitted image information representing a color image and command data used for editing the image information;

memory means for storing both the image information and the command data;

discriminating means for discriminating whether the command data readout from said memory means commands negative-positive reversal; and processing means for executing negative-positive reversal of the color image on the image information readout from said memory means in accordance with the discrimination result provided by said discriminating means, the command data being transmitted through a transmission line the same as that for transmission of the image information.

7. The apparatus according to claim 6, further comprising image forming means for forming a visible image of the color image which has undergone the negative-positive reversal.

8. The apparatus according to claim 7, wherein said image forming means is a laser-beam printer.

9. The apparatus according to claim 7, wherein said image forming means is a bubble-jet printer.

10. An image processing method comprising the steps of:

receiving transmitted image information representing a color image and command data used for editing the image information;

storing both the image information and the command data in a memory;

discriminating whether the command data readout from the memory commands negative-positive reversal; and executing negative-positive reversal of the color image on the image information readout from the memory in accordance with the discrimination result, the command data being transmitted through a transmission line the same as that for transmission of the image information.

11. An apparatus according to claim 6, wherein said receiving means receives the image information as code, and said processing means executes negative-positive reversal after code has been developed.

* * * * *

UNITED STATES PATENT AND TRADEMARK OFFICE
CERTIFICATE OF CORRECTION

PATENT NO. : 5,521,711          Page 1 of 2

DATED       : May 28, 1996

INVENTOR   : KEN ONODERA

It is certified that error appears in the above-identified patent and that said Letters Patent is hereby corrected as shown below:

ON THE TITLE PAGE
item,
[57] ABSTRACT

Line 3, "It" should read --If--.

COLUMN 3

Line 48, "0R" should read --OR--.

COLUMN 4

Line 39, "0R" should read --OR--.

COLUMN 6

Line 49, "MO, CO," should read --M0, C0,--.

UNITED STATES PATENT AND TRADEMARK OFFICE
CERTIFICATE OF CORRECTION

PATENT NO. : 5,521,711

DATED : May 28, 1996

INVENTOR : KEN ONODERA

It is certified that error appears in the above-identified patent and that said Letters Patent is hereby corrected as shown below:

<u>COLUMN 7</u>

Line 66, "MO, CO," should read --M0, C0,--.

Signed and Sealed this

Eighth Day of October, 1996

*Attest:*

BRUCE LEHMAN

*Attesting Officer*     *Commissioner of Patents and Trademarks*